US012286903B2

(12) United States Patent
Van Oflen et al.

(10) Patent No.: US 12,286,903 B2
(45) Date of Patent: Apr. 29, 2025

(54) TURBINE ENGINE INCLUDING A COMPOSITE AIRFOIL ASSEMBLY HAVING A DOVETAIL PORTION

(71) Applicant: GENERAL ELECTRIC COMPANY, Schenectady, NY (US)

(72) Inventors: Benjamin Thomas Van Oflen, Cincinnati, OH (US); Gary Willard Bryant, Jr., Loveland, OH (US); Michael John Franks, Cincinnati, OH (US); Elzbieta Kryj-Kos, Liberty Township, OH (US); Nicholas Joseph Kray, Mason, OH (US); Arthur William Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/173,989

(22) Filed: Feb. 24, 2023

(65) Prior Publication Data

US 2024/0287911 A1 Aug. 29, 2024

(51) Int. Cl.
*F01D 5/30* (2006.01)
*F01D 5/28* (2006.01)

(52) U.S. Cl.
CPC ........... *F01D 5/3007* (2013.01); *F01D 5/282* (2013.01); *F05D 2220/32* (2013.01); *F05D 2240/24* (2013.01); *F05D 2240/30* (2013.01)

(58) Field of Classification Search
CPC . F01D 5/26; F01D 5/282; F01D 5/288; F01D 5/30; F01D 5/3007; F01D 5/3015; F01D 5/3092; F05D 2220/32; F05D 2240/24; F05D 2240/30; F05D 2260/96
See application file for complete search history.

(56) References Cited

U.S. PATENT DOCUMENTS

| | | | | |
|---|---|---|---|---|
| 4,453,891 | A | 6/1984 | Forestier | |
| 4,527,952 | A | 7/1985 | Forestier et al. | |
| 5,123,813 | A | 6/1992 | Pryztulski et al. | |
| 5,275,536 | A | 1/1994 | Stephens et al. | |
| 5,279,892 | A | 1/1994 | Baldwin et al. | |
| 5,435,694 | A | 7/1995 | Kray et al. | |
| 6,736,602 | B2 | 5/2004 | Carney | |
| 8,105,042 | B2 | 1/2012 | Parkin et al. | |
| 8,419,374 | B2 | 4/2013 | Huth et al. | |
| 8,573,947 | B2 | 11/2013 | Klinetob et al. | |
| 8,696,319 | B2 | 4/2014 | Naik | |
| 8,708,656 | B2 | 4/2014 | Bamett et al. | |
| 9,500,083 | B2 * | 11/2016 | Cairo | B32B 5/26 |
| 10,047,611 | B2 | 8/2018 | Thistle et al. | |
| 10,215,035 | B2 | 2/2019 | Dierksmeier et al. | |

(Continued)

FOREIGN PATENT DOCUMENTS

| | | | |
|---|---|---|---|
| EP | 2386721 | A1 | 11/2011 |
| EP | 2907976 | A1 | 8/2015 |
| GB | 2507144 | A | 4/2014 |

*Primary Examiner* — Elton K Wong
(74) *Attorney, Agent, or Firm* — McGarry Bair PC

(57) ABSTRACT

A turbine engine having a disk and a composite airfoil assembly. The disk having a slot. The composite airfoil assembly having an airfoil portion, a dovetail portion, and a roll snubber. The dovetail portion having a radially inner surface. The roll snubber being provided on the radially inner surface. The radially inner surface spaced from the slot to define a gap therebetween.

20 Claims, 6 Drawing Sheets

(56) References Cited

U.S. PATENT DOCUMENTS

| | | | | |
|---|---|---|---|---|
| 10,677,064 | B2 | 6/2020 | Carter et al. | |
| 10,704,400 | B2 | 7/2020 | Sanzari et al. | |
| 10,774,660 | B2 | 9/2020 | Luczak | |
| 10,934,864 | B2 | 3/2021 | Lee | |
| 2004/0076523 | A1 * | 4/2004 | Sinha | F01D 5/3007 29/889.21 |
| 2013/0247586 | A1 | 9/2013 | Luczak | |
| 2014/0169975 | A1 * | 6/2014 | Drozdenko | F01D 5/3007 416/219 R |
| 2018/0045207 | A1 | 2/2018 | Paquin | |
| 2019/0331127 | A1 | 10/2019 | Foster et al. | |
| 2020/0109634 | A1 * | 4/2020 | Gondre | B29C 70/48 |
| 2020/0157954 | A1 * | 5/2020 | Burdgick | F01D 5/323 |

* cited by examiner

TURBINE ENGINE INCLUDING A COMPOSITE AIRFOIL ASSEMBLY HAVING A DOVETAIL PORTION

TECHNICAL FIELD

The disclosure generally relates to a turbine engine including a composite airfoil assembly, specifically, to a turbine engine including a composite airfoil assembly with having a dovetail portion.

BACKGROUND OF THE INVENTION

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

During operation air is brought into the compressor section through the fan section where it is then pressurized in the compressor and mixed with fuel in the combustor for generating hot combustion gases which flow downstream through the turbine stages where the air is expanded and exhausted out an exhaust section. The expansion of the air in the turbine section is used to drive the rotation sections of the fan section and the compressor section. The drawing in of air, the pressurization of the air, and the expansion of the air is done, in part, through rotation of various rotating blades mounted to respective disks throughout the fan section, the compressor section and the turbine section, respectively. The rotation of the rotating blades imparts mechanical stresses along various portions of the blade; specifically, where the blade is mounted to the disk.

Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DESCRIPTION OF EMBODIMENTS OF THE INVENTION

Figure 1:
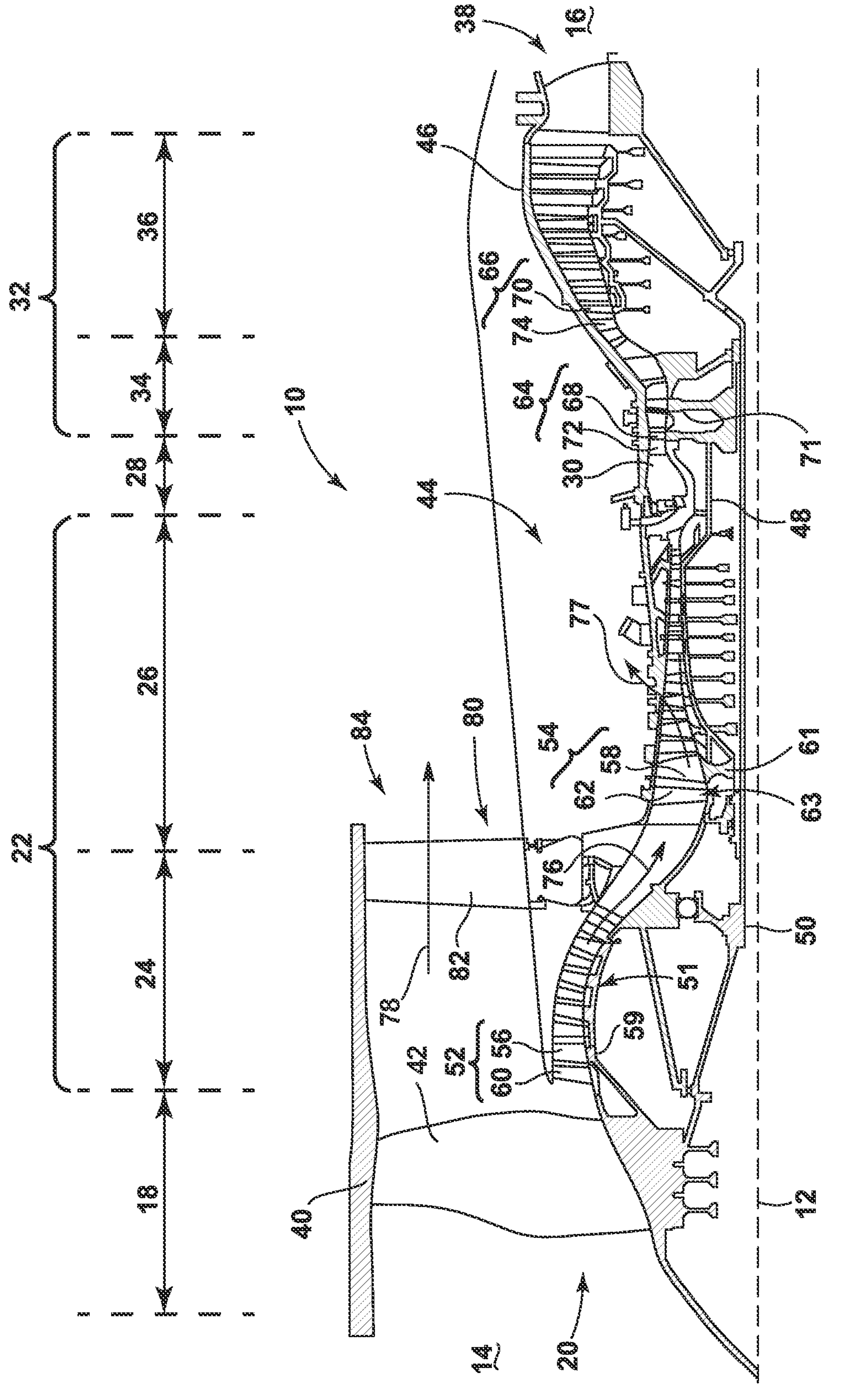
FIG. 1 is a schematic cross-sectional view of a turbine engine in accordance with an exemplary embodiment of the present disclosure.

Aspects of the disclosure herein are directed to a turbine engine including a composite airfoil assembly including a dovetail portion and an airfoil portion. The composite airfoil assembly can be used at one or more locations within the turbine engine. For example, the composite airfoil assembly is suitable as a fan blade in a fan section of a turbine engine. Other locations, such as the compressor section and turbine section are contemplated. The composite airfoil assembly can be mounted in a variety of ways. One such mounting is securing the blades to a spinner of the fan section, directly, or via a pitch control assembly. Wherever the composite airfoil assembly is located, one suitable mounting is a disk that has complementary slots to receive the dovetail portion, with the slots circumferentially spaced about the periphery of the disk. The composite airfoil assembly and disk can collectively form a rotating assembly such that the composite airfoil assembly is a composite blade assembly.

The composite airfoil assembly includes a core with an outer skin provided over the core. The dovetail portion of the composite airfoil assembly is placed within a slot. The dovetail portion is spaced from an inner slot face of the slot to define a gap therebetween. A roll snubber extends into the gap. The composite airfoil assembly, specifically the dovetail portion of the composite airfoil assembly, is designed to withstand high mechanical stresses associated with the operation of the turbine engine. For purposes of illustration, the present disclosure will be described with respect to a composite airfoil assembly for a turbine engine, and more specifically a composite airfoil assembly provided within a fan section of the turbine engine. It will be understood, however, that aspects of the disclosure described herein are not so limited and can have general applicability within other engines or within other portions of the turbine engine. For example, the disclosure can have applicability for a composite airfoil assembly in other engines or vehicles, and can be used to provide benefits in industrial, commercial, and residential applications. Further, aspects of this disclosure will be directed towards a composite blade assembly including a dovetail portion. It will be appreciated that aspects this disclosure are directed towards any composite airfoil assembly having a dovetail portion including, but not limited to, a composite blade assembly or a composite vane assembly.

As used herein, the term “upstream” refers to a direction that is opposite the fluid flow direction, and the term “downstream” refers to a direction that is in the same direction as the fluid flow. The term “fore” or “forward” means in front of something and “aft” or “rearward” means behind something. For example, when used in terms of fluid flow, fore/forward can mean upstream and aft/rearward can mean downstream.

Additionally, as used herein, the terms “radial” or “radially” refer to a direction away from a common center. For example, in the overall context of a turbine engine, radial refers to a direction along a ray extending between a center longitudinal axis of the engine and an outer engine circumference. Furthermore, as used herein, the term “set” or a “set” of elements can be any number of elements, including only one.

Further yet, as used herein, the term “fluid” or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term “fluid” can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader’s understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term “composite,” as used herein is, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a “composite” component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine 10 for an aircraft. The turbine engine 10 has a generally longitudinally extending axis or centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the turbine engine 10, which generates combustion gases. The core 44 is surrounded by a core casing 46, which can be coupled with the fan casing 40.

A HP shaft or spool 48 disposed coaxially about the engine centerline 12 of the turbine engine 10 drivingly connects the HP turbine 34 to the HP compressor 26. A LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outward relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outward relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor. The bleed air 77 can also be utilized by other systems.

A remaining portion of the airflow, referred to as a bypass airflow 78, bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
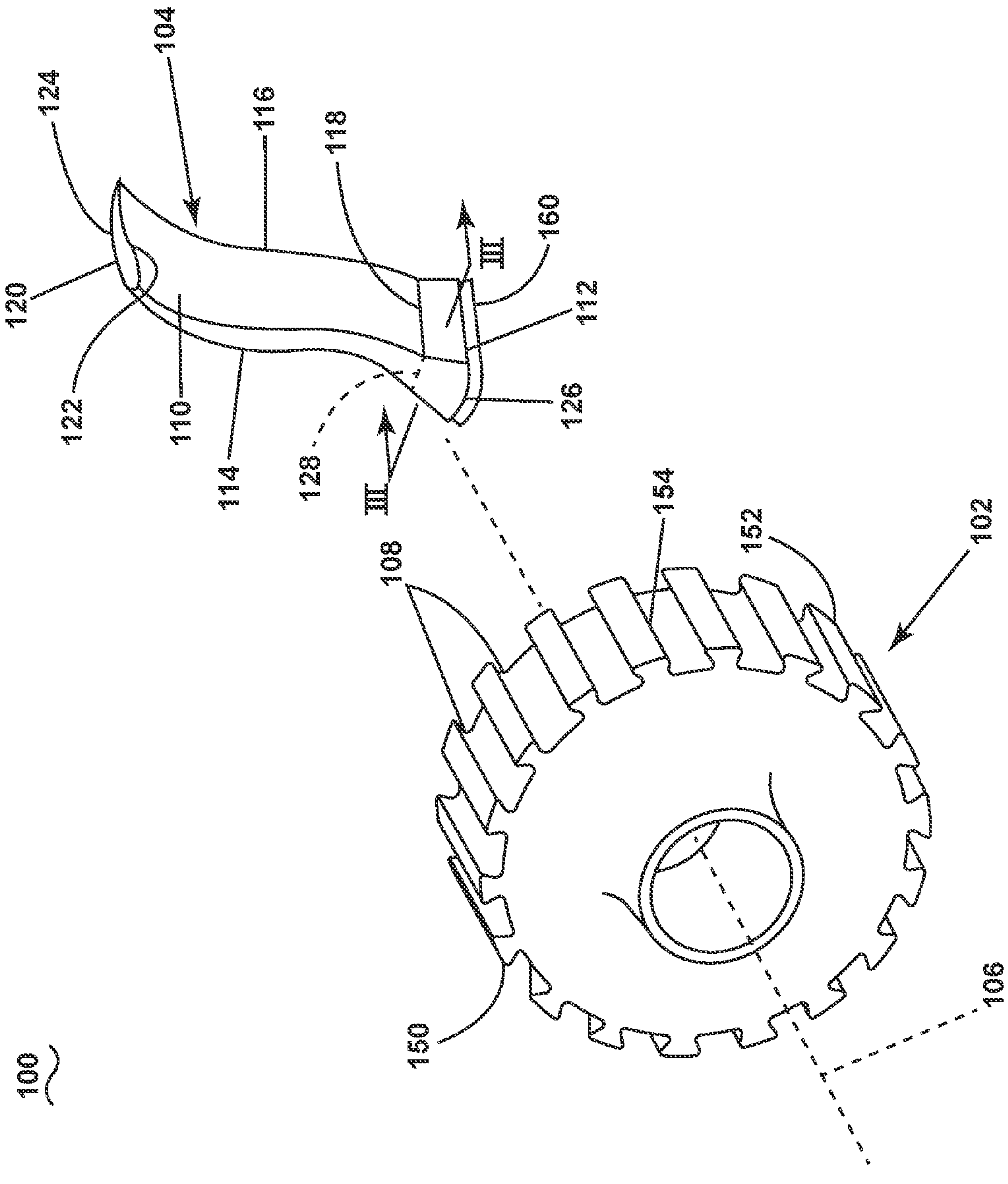
FIG. 2 is a schematic perspective view of a composite airfoil assembly and a disk suitable for use within the turbine engine of FIG. 1, the composite blade assembly including an airfoil portion, a dovetail portion, and a roll snubber

FIG. 2 is a schematic perspective view of a composite airfoil assembly 104 and a disk 102 suitable for use within the turbine engine 10 of FIG. 1. The disk 102 is suitable for use as the disk 61, 71 (FIG. 1) or any other disk such as, but not limited to, a disk within the fan section 18 of the turbine engine 10. The composite airfoil assembly 104 can be rotating or non-rotating such that the composite airfoil assembly 104 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42. As a non-limiting example, the composite airfoil assembly 104 can be a composite fan blade assembly.

The disk 102 can be rotatable or stationary about a rotational axis 106. In an instance where the disk 102 is stationary, it will be appreciated that the disk 102 can be any suitable stationary portion of the turbine engine that the composite airfoil assembly 104 is couplable to, such as, but not limited to, a band, a shroud, a casing, or the like. The rotational axis can coincide with or be offset from the engine centerline (e.g., the engine centerline 12 of FIG. 1). The disk 102 includes disk forward surface 150 and a disk aft surface 152 with a periphery 154 interconnecting the disk forward surface 150 and a disk aft surface 152. A plurality of slots 108 extend axially along the periphery 154 between the disk forward surface 150 and the disk aft surface 152. Each slot of the plurality of slots 108 extends radially inward from the periphery 154 towards the rotational axis 106. Each slot of the plurality of slots 108 extends a total circumferential distance that is less than a total axial distance that the slot extends along the periphery 154.

The composite airfoil assembly 104 includes an airfoil portion 110 and a dovetail portion 112 extending from the airfoil portion 110. The airfoil portion 110 extends between a leading edge 114 and a trailing edge 116 to define a chord-wise direction. The airfoil portion 110 extends between a root 118 and a tip 120 to define a span-wise direction. The airfoil portion 110 includes a pressure side 122 and a suction side 124. The dovetail portion 112 extends between a first end 126 and a second end 128 in the span-wise direction. The first end 126 defines a radially inner surface of the dovetail portion 112. The first end 126 is radially spaced inwardly from the second end 128, with respect to the rotational axis 106. The second end 128 denotes a transition between the dovetail portion 112 and the airfoil portion 110. As a non-limiting example, the second end 128 coincides with the root 118 of the airfoil portion 110. The dovetail portion 112 and the airfoil portion 110 can be integrally or non-integrally formed with each other.

A roll snubber 160 extends radially outwardly from the first end 126 of the dovetail portion 112. The roll snubber 160 can be coupled to or integrally formed with the dovetail portion 112.

The composite airfoil assembly 104 is coupled to the disk 102 by inserting at least a portion of the dovetail portion 112 through a respective slot of the plurality of slots 108. The airfoil portion 110 extends radially outward from the periphery 150. The composite airfoil assembly 104 is held in place by frictional contact with the slot 108 or can be coupled to the slot 108 via any suitable coupling method such as, but not limited to, welding, adhesion, fastening, or the like. While only a single composite airfoil assembly 104 is illustrated, it will be appreciated that there can be any number of composite airfoil assemblies 104 coupled to the disk 102. As a non-limiting example, there can be a plurality of composite airfoil assemblies corresponding to a total number of slots of the plurality of slots 108.

Figure 3:
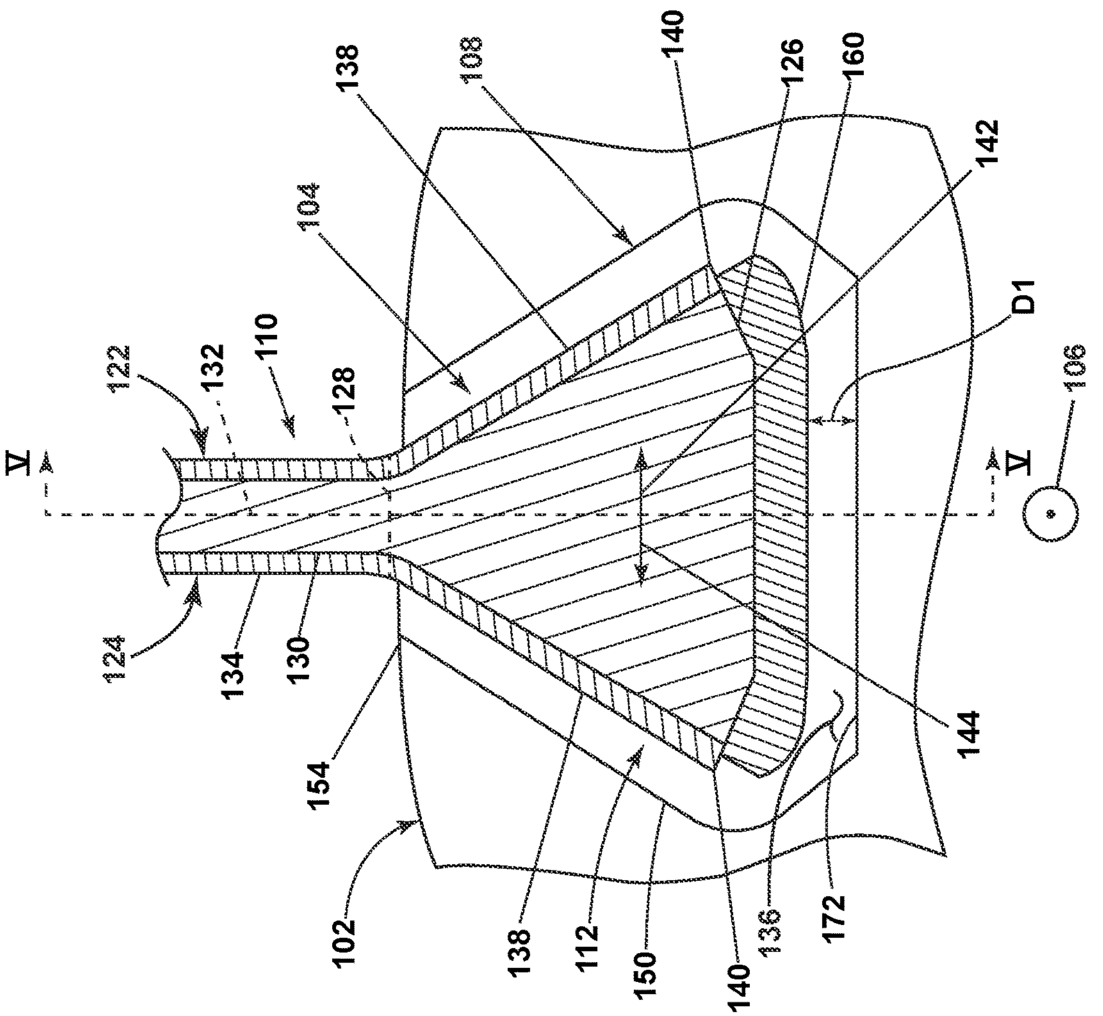
FIG. 3 is a schematic cross-sectional front view of a section of the composite airfoil assembly received within a slot of the disk as seen from sectional line III-III of FIG. 2, further illustrating a core, an outer skin and the roll snubber

FIG. 3 is a schematic cross-sectional front view of a section of the composite airfoil assembly 104 as seen from sectional line III-III of FIG. 2. The composite airfoil assembly 104 is received within a respective slot 108. The composite airfoil assembly 104 extends along a centerline axis 132 extending from the first end 126 of the dovetail to the tip 120 (FIG. 2) of the airfoil portion 110. The centerline axis 132 is equidistant from respective opposing portions of the composite airfoil assembly 104. The centerline axis 132 can split the composite airfoil assembly between a first radial half 142 and a second radial half 144, with respect to the centerline axis 132. The centerline axis 132 can be linear or non-linear. The composite airfoil assembly 104 can be symmetric or non-symmetric about the centerline axis 132. The centerline axis 132 can also be a body axis, which, in the case of an asymmetrical airfoil, may not extend along the center of the body.

The composite airfoil assembly 104 includes a core 130 defining and extending between respective portions of the dovetail portion 112 and the airfoil portion 110. The core 130 can extend from the first end 126 to the tip 120 (FIG. 2) along the centerline axis 132. The core 130, as discussed herein, can include at least one composite layer (e.g., a composite ply). It will be appreciated that the core 130 is defined by a body within the interior of the composite airfoil assembly 104 that includes a radially outermost portion of the core 130 with respect to the centerline axis 132 that includes a composite material.

An outer skin 134 overlays a portion of the core 130 at least corresponding to the dovetail portion 112. As used herein, a "skin" refers to a layer of material having multiple plies or layers of composite materials. Further, a single skin is defined by layers or plies that have the same material properties with respect to one another. The outer skin 134 can include multiple stacked composite plies. The outer skin 134 can further be defined as a laminate skin. The outer skin 134 can define an outer wall of the airfoil portion 110.

The dovetail portion 112 includes opposing side walls 138 interconnected by the first end 126. Each side wall of the opposing side walls 138 meets the first end 126 at a respective corner 140. The outer skin 134, as illustrated, can form the opposing side walls 138 and the corner 140. The dovetail portion 112 is formed by overlaying the core 130 with the outer skin 134.

The dovetail portion 112 includes a flared cross-sectional area that extends radially outward, with respect to the centerline axis 132, from the second end 128 and to the first end 126. The outer skin 134 follows this flared cross-sectional area of the dovetail portion 112.

The roll snubber 160, as illustrated, extends radially inward from the first end 126 of the dovetail portion 112. The roll snubber 160 extends circumferentially along at least a portion of the first end 126 of the dovetail portion 112. As a non-limiting example, the roll snubber 160 can extend across less than or across an entirety of a total circumferential length of the first end 126. As a non-limiting example, the roll snubber 160 can extend circumferentially across an entirety of the core 130 and extend circumferentially along at least a portion of the outer skin 134. As a non-limiting example, the roll snubber 160 can terminate circumferentially along the outer skin 134 or otherwise extend circumferentially across an entirety of the outer skin 134. As a non-limiting example, the roll snubber 160 can extend across at least a portion of a distal end of the outer skin 134 defining a respective portion of the radially inner surface 124. The roll snubber 160 can be coupled to or integrally formed with the core 130 or the outer skin 134. As a non-limiting example, the roll snubber 160 can be provided only at or circumferentially near the corners 140 or at a single corner 140. As a non-limiting example, the roll snubber 160 can be segmented such that it includes the illustrated circumferentially outer portions (e.g., the portions nearest the outer skin 134 and corners 140) but does not include the portion extending between the circumferentially outer portions (e.g., the portion along the core 130).

The roll snubber 160 can include any suitable cross-sectional area having any suitable shape. The roll snubber 160 can be any suitable material. As a non-limiting example, the roll snubber 160 can be a composite, a metal or a plastic.

It is contemplated that the core 130 and the outer skin 134 can further be defined by their material properties. As non-limiting examples, the core 130 and the outer skin 134 can have differing material properties with respect to one another. As a non-limiting example, the core 130 can include a first bulk modulus and the outer skin 134 can include a second bulk modulus, non-equal to the first bulk modulus It will be appreciated that the roll snubber 160 can be integrally formed with or coupled to at least one of either the core 130 or the outer skin 134. When integrally formed with the core 130 or the outer skin 134, the roll snubber 160 can be bonded to a composite portion of the core 130 or the outer skin 134 through any suitable bonding method. In other words, the roll snubber 160 can be made of the same material as the core 130 or the outer skin 134 and subsequently bonded to the core 130 or the outer skin 134, respectively. In the instance where the roll snubber 160 is bonded to the core 130 or the outer skin 134, the roll snubber 160 includes the same material properties as the core 130 or the outer skin 134, respectively. As a non-limiting example, when bonded to the core 130, the roll snubber 160 can have the same bulk modulus as the core 130 In either case, the roll snubber 160 can be defined by a differing formation with respect to orientation of the fibers that make up the core 130 or the outer skin 134. As a non-limiting example, the roll snubber 160 can include a composite ply with a plurality of fibers having a directional orientation. Similarly, the core 130 or the outer skin 134 can include a composite ply with a plurality of fibers having a directional orientation. The directional orientation of the plurality of fibers of the roll snubber 160 can be different from the directional orientation of the plurality of fibers of the core 130 or the outer skin 134.

While illustrated as a single outer skin 134, it will be appreciated that there can be any number of one or more skins, each including discrete layers of composite plies, stacked on top of one another and overlying a respective portion of the composite airfoil assembly 104. The one or more skins can each include varying bulk moduli. Further, while illustrated as a composite airfoil assembly 104 having the core 130 and the outer skin 134, it will be appreciated that the composite airfoil assembly 104 can include a singular body (e.g., just the core 130) having a single bulk modulus or material property throughout.

The composite airfoil assembly 104 is at least partially received within the slot 108. The slot 108 includes an inner slot face 172. The inner slot face 172 is radially opposite the periphery 154. The roll snubber 160 is spaced a distance (D1) radially from the inner slot face 172, with respect to the rotational axis 106. It will be appreciated that the roll snubber 160 can extend radially inwardly from the first end 126 and towards the inner slot face 172.

The first end 126 of the dovetail portion 112 is radially spaced from the inner slot face 172 to define a gap 136 therebetween. The roll snubber 160 extends into the gap 136.

As discussed herein, the composite airfoil assembly 104 can be symmetric or non-symmetric about the centerline axis 132. As a non-limiting example, the roll snubber 160 can be symmetric or non-symmetric about the centerline axis 132.

Figure 4:
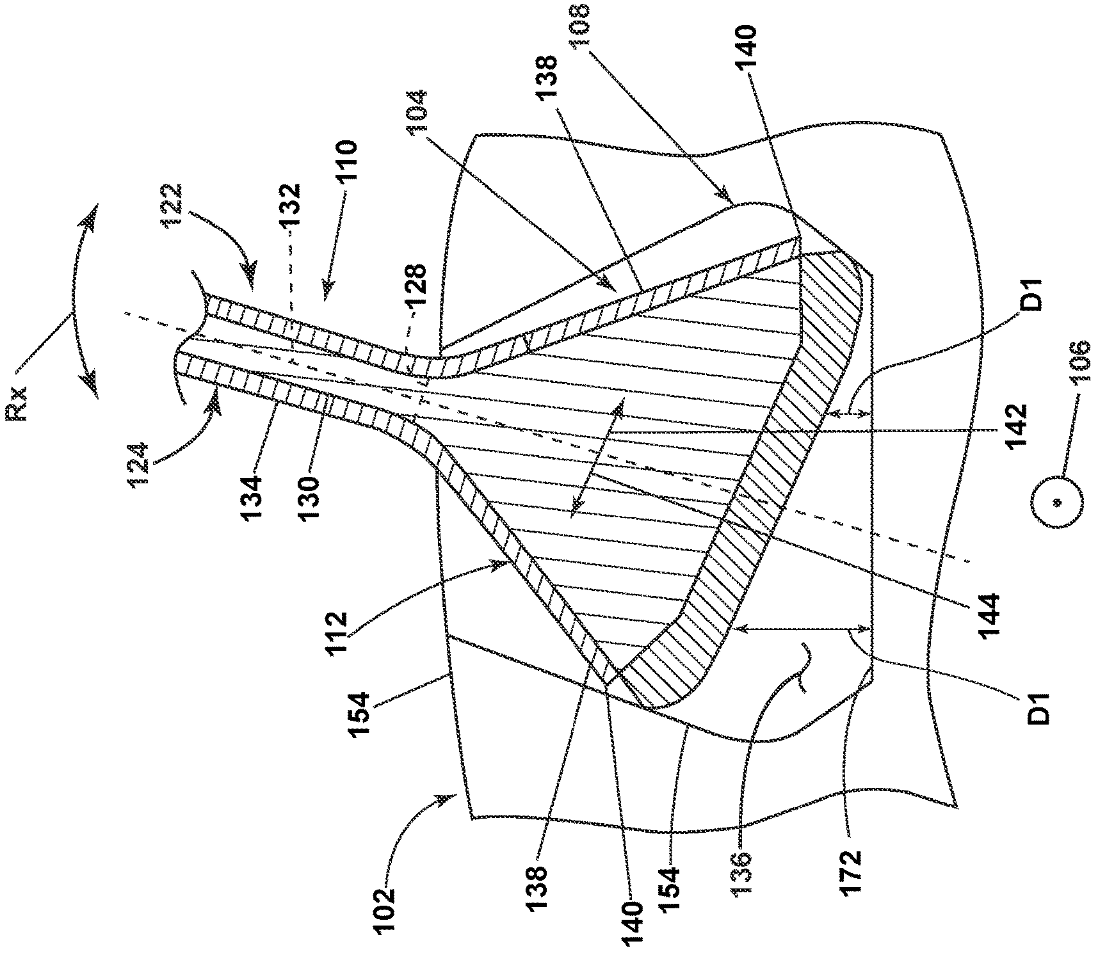
FIG. 4 is a schematic cross-sectional front view of the composite airfoil assembly as seen received within the slot as seen from sectional line III-III of FIG. 2, further illustrating the relative rotation between the composite blade assembly and the disk.

FIG. 4 is a schematic cross-sectional front view of the section of the composite airfoil assembly 104 as seen from sectional line III-III of FIG. 2, illustrating relative rotation between the composite airfoil assembly 104 and the disk 102.

During rotation of the composite airfoil assembly 104 and the disk 102 about the rotational axis 106, the composite airfoil assembly 104 can move circumferentially along a roll axis (Rx). As a non-limiting example, the composite airfoil assembly 104 can rotate towards the first radial half 142 such that the first distance (D1) is decreased on the first radial half 142 and increased on the second radial half 144.

It is contemplated that during some operations a high circumferential force can be exerted onto the composite airfoil assembly 104 causing the composite airfoil assembly 104 to roll along the roll axis (Rx) such that the first distance (D1) is zero along a portion of the roll snubber 160. The roll snubber 160 is positioned and sized, however, to ensure that portions of the composite airfoil assembly 104 do not contact the slot 108. As a non-limiting example, the roll snubber 160 is sized to ensure that the corner 140 does not contact the slot 108.

The roll snubber 160 is used to ensure that the corner 140 of the dovetail portion 112 opposite the direction of rotation (e.g., the corner 140 on the pressure side 122 as illustrated) does not contact or otherwise forcefully contact the slot 108. The corner 140 on the opposite side of the direction of rotation will be herein referred to as the rotational corner 140. The roll snubber 160 stops the rotational corner 140 from contacting the slot 108 or otherwise limits the force that the rotational corner 140 contacts the slot 108 with. If the roll snubber 160 were not included, the rotational corner 140 would contact the slot 108 with such a force that could cause damage to the composite airfoil assembly 104.

As discussed herein, the outer skin 134 can include a composite ply with a plurality of fibers having a directional orientation. It is contemplated that the directional orientation of the plurality of fibers of the outer skin 134 can be selected for normal operation of the turbine engine 10 (FIG. 1). The directional orientation of the plurality of fibers, however, is not suited for an instance where the rotational corner 140 contacts the slot 108 and a shear stress is transmitted through at least a portion of the outer skin 134. This shear stress could, in some instances, cause the outer skin 134 to break or otherwise fracture. As such, the inclusion of the roll snubber 160 ensures that the outer skin 134 does not break or fracture. In instances where the roll snubber 160 is also made from a composite material, the directional orientation of the plurality of fibers can be selected such that the roll snubber 160 contacting the slot 108 does not result in the roll snubber 160 breaking or fracturing.

Figure 5:
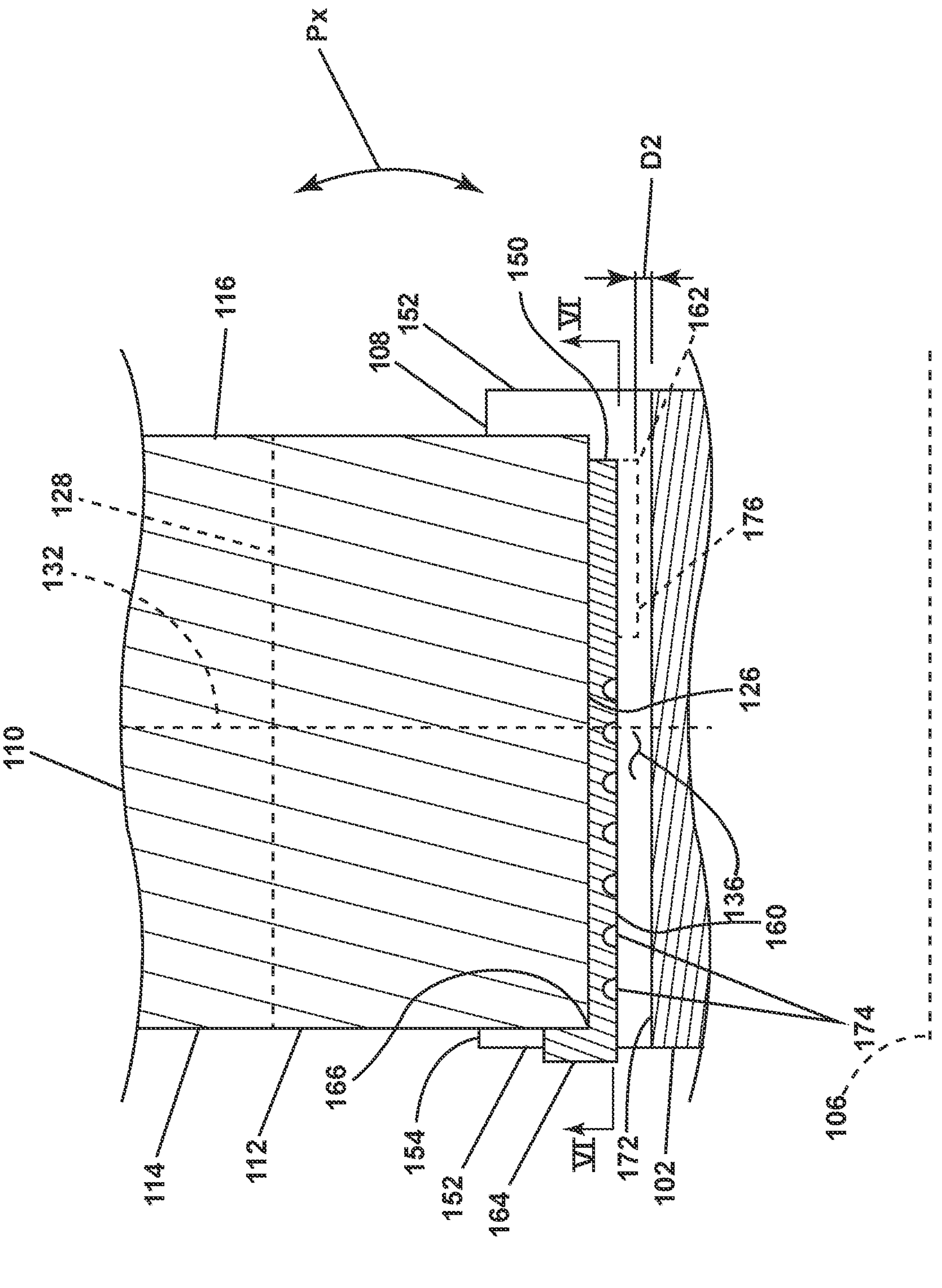
FIG. 5 is a schematic cross-sectional side view of a section of the composite airfoil assembly as seen from sectional line V-V of FIG. 3, further illustrating a seat formed along the roll snubber.

FIG. 5 is a schematic cross-sectional side view of a portion of the composite airfoil assembly 104 viewed along sectional line V-V of FIG. 3. The roll snubber 160 can extend axially between the leading edge 114 and the trailing edge 116, with respect to the rotational axis 106. The roll snubber 160 can extend axially along an entirety, greater than the entirety, or less than the entirety of an axial span of the dovetail portion along the first end 126.

The roll snubber 160 can include at least one retainer 164. The retainer 164 is defined as a portion of the roll snubber 160 that extends axially outward from at least one of the leading edge 114 or trailing edge 116 and radially outward from the rotational axis 106 along the leading edge 114 or trailing edge 116, respectively. The at least one retainer 164 forms a seat 166 for the dovetail portion 112. The at least one retainer 164 limits the movement of the composite airfoil assembly 104 in the axial direction and further retains the roll snubber 160 onto the composite airfoil assembly 104. While illustrated as a single retainer 164 extending axially forward of the leading edge 114, it will be appreciated that the roll snubber 160 can include a first retainer and a second retainer; the first retainer 164 forming a seat 166 at the leading edge 114 and the second retainer 164 extending axially aft of the trailing edge 116 and forming a seat (not shown) for the trailing edge 116.

It is contemplated that the roll snubber 160 can extend axially along the span of the dovetail portion 112 greater than or equal to 30% and less than or equal to 110% of the total axial length of the dovetail portion 112. With 0% corresponding to one of either the leading edge 114 or the trailing edge 116 at the first end 126. Further, it is contemplated that the roll snubber 160 can extend between the leading edge 114 and the trailing edge 116. As a non-limiting example, the roll snubber 160 can extend from a portion of the first end 126 downstream of, upstream of, or at the leading edge 114 to a portion of the first end 126 upstream of, at, or downstream of the trailing edge 116.

The roll snubber 160 can include a series of cutouts formed as dimples 174 along the roll snubber 160. The dimples 174 define a concave portion of the roll snubber 160 with an absence of material. The dimples 174 are used to reduce the overall weight of the roll snubber 160 without sacrificing the structural integrity or intended use of the roll snubber 160.

A pitch snubber 162 can optionally extend radially inward from the roll snubber 160 and terminate at a snubber face 176 within the gap 136. The snubber face 176 is provided at a second distance (D2) radially between the snubber face 176 and the inner slot face 172. As a non-limiting example, the second distance (D2) can be greater than or equal to 0.02 inches and less than or equal to 0.5 inches.

The pitch snubber 162 can be integrally formed with or coupled to the roll snubber 160. The pitch snubber 162 can have the same or different material properties as the roll snubber 160.

The roll snubber 160 and the pitch snubber 162 can include any suitable material. It is contemplated that in some instances at least a portion of the roll snubber 160 or the pitch snubber 162 can include any suitable coating to effectively shield the roll snubber 160, the pitch snubber 162, or the composite airfoil assembly 104 from any anticipated force that the pitch snubber 162, the roll snubber 160 and the composite airfoil assembly 104 will experience during operation of the turbine engine. As a non-limiting example, at least a portion of the roll snubber 160 can include an environmental barrier coating that can be used to shield at least the roll snubber 160 from any anticipated thermal forces. As a non-limiting example, the retainer 164 can include the environmental barrier coating as the retainer 164 defines an axially forwardmost portion of the roll snubber 160 and would thus experience the highest thermal forces (e.g., from a wind or airflow that flows from the leading edge 114 to the trailing edge 116).

During rotation of the composite airfoil assembly 104 and the disk 102, an axial force can be imparted on the leading edge 114 of the composite airfoil assembly 104. This axial force can cause the composite airfoil assembly 104 to rotate along a pitch axis (Px). Specifically, the axial force can cause the composite airfoil assembly 104 to rotate along the pitch axis (Px) toward the inner slot face 172. During rotation, the pitch snubber 162 can come into contact with the inner slot face 172 and stop further rotation of the composite airfoil assembly 104 along the pitch axis (Px) towards the inner slot face 172. It is contemplated that in some instances, an axial force can be experienced from the trailing edge 116 to the leading edge 114. In such a case, the pitch snubber 162 can be provided axially forward the centerline axis 132 to contact a respective portion of the inner slot face 172. In either case, the pitch snubber 162 limits the total distance that the composite airfoil assembly 104 can rotate forward or rearward with respect to the pitch axis (Px). The pitch snubber 162, like the roll snubber 160, ensures that composite materials of the composite airfoil assembly 104 do not come into contact with the hard material of the slot 108.

Figure 6:
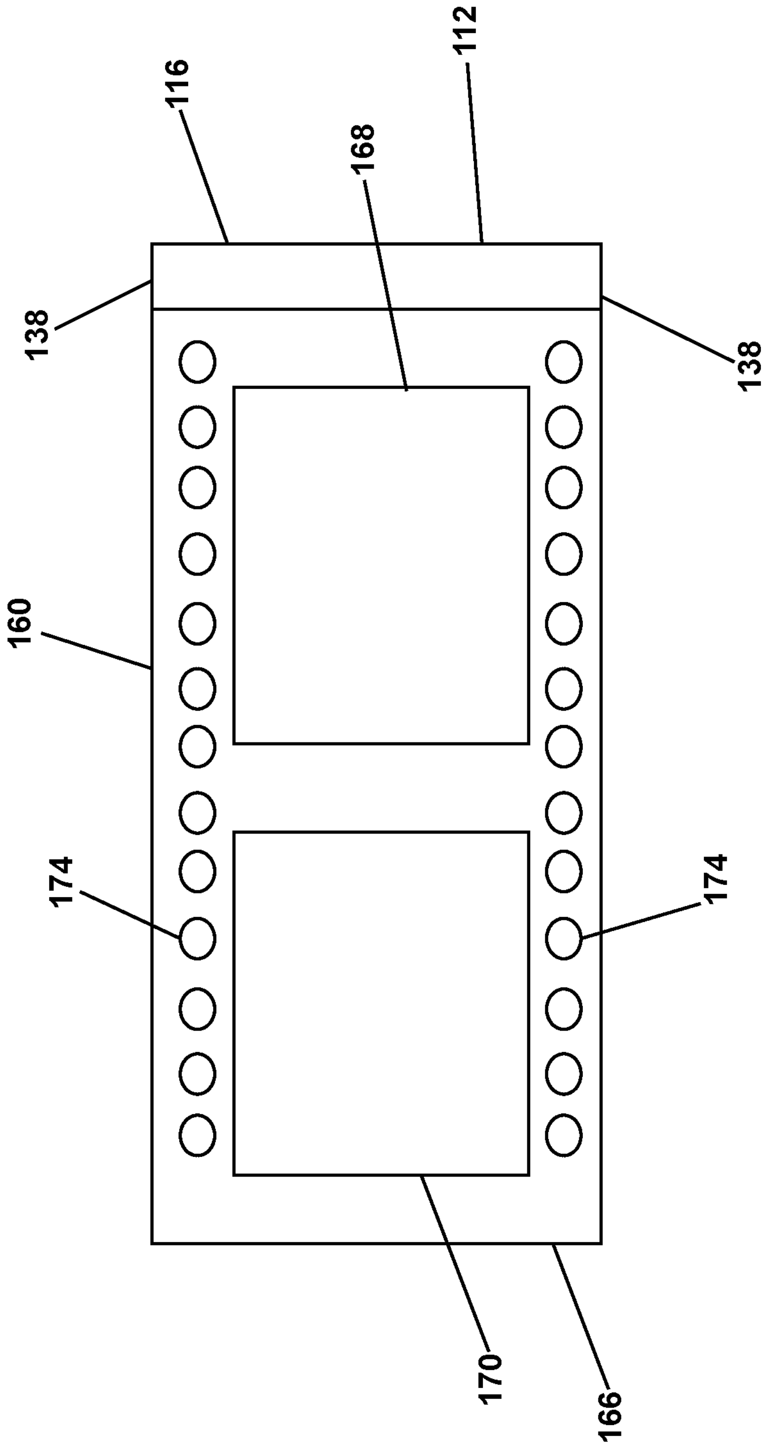
FIG. 6 is a schematic bottom view of the composite airfoil assembly as seen from sectional line VI-VI of FIG. 5, further illustrating a series of cutouts formed along the roll snubber.

FIG. 6 is a schematic bottom-up view of the composite airfoil assembly 104 as seen from sectional line VI-VI of FIG. 5.

The roll snubber 160 can include additional cutouts besides the dimples 174. As a non-limiting example, the roll snubber 160 can include a first-through hole 168 and a second through-hole 170, each extending radially through the roll snubber 160 to define an absence of material within the roll snubber 160. The first through-hole 168 and the second through-hole 170, like the dimples 174, are used to reduce the overall weight of the roll snubber 160 without sacrificing the structural integrity of the roll snubber 160. The reduction of the overall weight of the roll snubber 160 through the dimples 174, the first through-hole 168 and the second through-hole 170 ultimately results in a more efficient composite airfoil assembly 104, which in turn results in a more efficient turbine engine.

Benefits associated with the use of a composite airfoil assembly include a lighter airfoil assembly without sacrificing performance of the airfoil assembly when compared to a non-composite (e.g., cast) airfoil assembly. In other words, the materials used for the composite airfoil assembly are lighter than the materials used for the non-composite airfoil assembly and do not sacrifice the ability to perform as intended within the turbine engine. The decreased weight of the airfoil assembly, in turn, means an increased efficiency of the turbine engine when compared to a conventional turbine engine including the non-composite airfoil assembly.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising a disk rotatable about a rotational axis and having a disk forward surface, a disk aft surface, a periphery interconnecting the disk forward surface and the disk aft surface, and a slot extending axially along the periphery between the disk forward surface and the disk aft surface, the slot having an inner slot face radially opposite the periphery, and a composite airfoil assembly extending between a leading edge and a trailing edge, the composite airfoil assembly comprising an airfoil portion extending radially outward from the periphery, a dovetail portion supporting the airfoil portion and being slidably received within the slot, the dovetail portion having a radially inner surface that extends axially a total axial length between the leading edge and the trailing edge, the radially inner surface spaced radially from the inner slot face to define a gap therebetween, and a side wall, which meets the radially inner surface to define a dovetail corner, and a roll snubber provided within the gap and on the radially inner surface, the roll snubber preventing the dovetail corner from contacting the slot during rotation of the composite airfoil assembly.

A turbine engine comprising a disk rotatable about a rotational axis and having a disk forward surface, a disk aft surface, a periphery interconnecting the disk forward surface and the disk aft surface, and a slot extending axially along the periphery between the disk forward surface and the disk aft surface, the slot having an inner slot face radially opposite the periphery, and a composite airfoil assembly extending between a leading edge and a trailing edge, the composite airfoil assembly comprising an airfoil portion extending radially outward from the periphery, a dovetail portion supporting the airfoil portion and being slidably received within the slot, the dovetail portion having a radially inner surface that extends axially a total axial length between the leading edge and the trailing edge, the radially inner surface spaced radially from the inner slot face to define a gap therebetween, a roll snubber provided on the radially inner surface extending axially between greater than or equal to 30% and less than or equal to 110% of the total axial length.

A turbine engine comprising a disk rotatable about a rotational axis and having a disk forward surface a disk aft surface a periphery interconnecting the disk forward surface and the disk aft surface, and a slot extending axially along the periphery between the disk forward surface and the disk aft surface; and a composite airfoil assembly comprising an airfoil portion extending radially outward from the periphery, a dovetail portion supporting the airfoil portion and being slidably received within the slot, and a roll snubber integrally formed with at least a portion of the dovetail portion.

The turbine engine of any preceding clause, wherein the composite airfoil assembly comprises a core comprising braided or woven fibers and defining at least a portion of the dovetail portion and the airfoil portion, the core having a material having a first bulk modulus, an outer skin, formed with multiple plies, overlaying the core and defining an outer wall of the composite airfoil assembly, the outer skin having a material having a second bulk modulus.

The turbine engine of any preceding clause, wherein the roll snubber extends circumferentially across an entirety of the core at the radially inner surface.

The turbine engine of any preceding clause, wherein the roll snubber extends across at least a portion of a distal end of the outer skin defining a respective portion of the radially inner surface.

The turbine engine of any preceding clause, wherein the roll snubber extends across an entirety of the distal end of the outer skin.

The turbine engine of any preceding clause, wherein the first bulk modulus and the second bulk modulus are non-equal.

The turbine engine of any preceding clause, wherein the roll snubber includes at least one cutout defining an absence of material within the roll snubber, with the at least one cutout being at least one of a through-hole extending through the roll snubber, or a dimple extending into a respective portion of the roll snubber.

The turbine engine of any preceding clause, wherein the roll snubber includes at least one retainer extending axially, with respect to the rotational axis, outward from the trailing edge or the leading edge at the radially inner surface.

The turbine engine of any preceding clause, wherein the at least one retainer extends radially, with respect to the rotational axis, and forms a seat for a respective one of the leading edge or the trailing edge at the radially inner surface.

The turbine engine of any preceding clause, wherein the at least one retainer includes a first retainer extending axially forward of, with respect to the rotational axis, and forming a seat for the leading edge, and a second retainer extending axially aft of, with respect to the rotational axis, and forming a seat for the trailing edge.

The turbine engine of any preceding clause, wherein the composite airfoil assembly extends along a centerline axis from the radially inner surface to a radial outer surface, and at least a portion of the dovetail portion and the roll snubber are symmetric or non-symmetric about the centerline axis.

The turbine engine of any preceding clause, further comprising a pitch snubber extending radially inward from the roll snubber, with respect to the rotational axis.

The turbine engine of any preceding clause, wherein the roll snubber extends axially greater than or equal to 30% and less than or equal to 110%, of the total axial length, with 0% corresponding to one of either the leading edge or the trailing edge at the radially inner surface.

The turbine engine of any preceding clause, wherein the roll snubber includes a composite, a metal, or a plastic.

The turbine engine of any preceding clause, wherein the turbine engine includes a fan section, with the composite airfoil assembly being provided within the fan section.

The turbine engine of any preceding clause, wherein at least a portion of the composite airfoil assembly includes a composite material including at least one of a polymer matrix composite, a ceramic matrix composite, a metal matrix composite, carbon fiber, polymeric resin, a thermoplastic, a bismaleimide, a polyimide, an epoxy resin, a glass fiber, or a silicon matrix The turbine engine of any preceding clause, wherein at least a portion of composite airfoil assembly includes the polymer matrix composite.

The turbine engine of any preceding clause, wherein the roll snubber is bonded to at least a portion of the dovetail portion.

What is claimed is:

1. A turbine engine comprising:

a disk rotatable about a rotational axis and having:

a disk forward surface;

a disk aft surface;

a periphery interconnecting the disk forward surface and the disk aft surface; and a slot extending axially along the periphery between the disk forward surface and the disk aft surface, the slot having an inner slot face radially opposite the periphery; and a composite airfoil assembly comprising:

an airfoil portion extending radially outward from the periphery, the airfoil portion having opposing side walls extending between a root and a tip and between a leading edge and a trailing edge;

a dovetail portion extending from the root and being slidably received within the slot, the dovetail portion having:

a radially inner surface that extends axially, with respect to the rotational axis, a total axial length between the leading edge and the trailing edge, the radially inner surface spaced radially from the inner slot face to define a gap therebetween; and a side wall, which meets the radially inner surface to define a dovetail corner;

a centerline extending from the radially inner surface to the tip, the centerline being equidistant between the opposing side walls;

a composite core extending axially, with respect to the centerline, through a respective portion of the dovetail portion and the airfoil portion;

a laminate skin extending axially, with respect to the centerline, from the radially inner surface and along a respective portion of the composite core and defining a respective portion of the side wall, the laminate skin defining a receptive portion of the radially inner surface; and a roll snubber provided within the gap and on the radially inner surface, the roll snubber extending radially, with respect to the centerline, along the radially inner surface and at least radially to a transition between the composite core and the laminate skin, a contact between the roll snubber and the radially inner surface terminating radially along the laminate skin, with respect to the centerline, the roll snubber preventing the dovetail corner from contacting the slot during rotation of the composite airfoil assembly.

2. The turbine engine of claim 1, wherein:

the composite core comprises braided or woven fibers and defines at least a portion of the dovetail portion and the airfoil portion, and the composite core has a material having a first bulk modulus; and the laminate skin is formed with multiple plies overlaying the composite core and defines an outer wall of the composite airfoil assembly, and the laminate skin has a material having a second bulk modulus.

3. The turbine engine of claim 2, wherein the first bulk modulus and the second bulk modulus are non-equal.

4. The turbine engine of claim 1, wherein the roll snubber includes at least one cutout defining an absence of material within the roll snubber, with the at least one cutout being at least one of a through-hole extending through the roll snubber, or a dimple extending into a respective portion of the roll snubber.

5. The turbine engine of claim 1, wherein the roll snubber includes at least one retainer extending axially, with respect to the rotational axis, outward from the trailing edge or the leading edge at the radially inner surface.

6. The turbine engine of claim 5, wherein the at least one retainer extends radially, with respect to the rotational axis, and forms a seat for a respective one of the leading edge or the trailing edge at the radially inner surface.

7. The turbine engine of claim 5, wherein the at least one retainer includes:

a first retainer extending axially forward of, with respect to the rotational axis, and forming a seat for the leading edge; and a second retainer extending axially aft of, with respect to the rotational axis, and forming a seat for the trailing edge.

8. The turbine engine of claim 1, wherein at least a portion of the dovetail portion and the roll snubber are symmetric about the centerline.

9. The turbine engine of claim 1, further comprising a pitch snubber extending radially inward from the roll snubber, with respect to the rotational axis.

10. The turbine engine of claim 1, wherein the roll snubber extends axially, with respect to the rotation axis, greater than or equal to 30% and less than or equal to 110%, of the total axial length, with 0% corresponding to one of either the leading edge or the trailing edge at the radially inner surface.

11. The turbine engine of claim 1, wherein the roll snubber includes a composite, a metal, or a plastic.

12. The turbine engine of claim 1, wherein at least a portion of the composite airfoil assembly includes a composite material including at least one of a polymer matrix composite, a ceramic matrix composite, a metal matrix composite, carbon fiber, polymeric resin, a thermoplastic, a bismaleimide, a polyimide, an epoxy resin, a glass fiber, or a silicon matrix.

13. The turbine engine of claim 12, wherein at least a portion of the composite airfoil assembly includes the polymer matrix composite.

14. The turbine engine of claim 1, wherein roll snubber is integrally formed with at least a portion of the dovetail portion.

15. The turbine engine of claim 14, wherein the roll snubber is bonded to at least a portion of the dovetail portion.

16. The turbine engine of claim 1, wherein the composite core extends axially from the radially inner surface.

17. The turbine engine of claim 1, wherein the laminate skin terminates axially, with respect to the centerline, at a distal end along the radially inner surface, and the roll snubber extends radially, with respect to the centerline, less than an entirety of a radial extent of the distal end.

18. A composite airfoil assembly rotatable about a rotational axis, the composite airfoil assembly having a centerline and extending between a leading edge and a trailing edge, the composite airfoil assembly comprising:

an airfoil portion having opposing side walls extending between a root and a tip and between a leading edge and a trailing edge;

a dovetail portion extending from the root, the dovetail portion having:

a radially inner surface that extends axially, with respect to the rotational axis, a total axial length between the leading edge and the trailing edge;

a side wall, which meets the radially inner surface to define a dovetail corner;

a centerline extending from the radially inner surface to the tip, the centerline being equidistant between the opposing side walls;

a composite core extending axially, with respect to the centerline, through a respective portion of the dovetail portion and the airfoil portion;

a laminate skin extending axially, with respect to the centerline, from the radially inner surface and along a respective portion of the composite core and defining a respective portion of the side wall, the laminate skin defining a receptive portion of the radially inner surface; and a roll snubber extending axially outward, with respect to the centerline, from the radially inner surface, the roll snubber extending radially, with respect to the centerline, along the radially inner surface, a contact between the roll snubber and the radially inner surface terminating radially along the laminate skin, with respect to the centerline.

19. The composite airfoil assembly of claim 18, wherein the composite core:

comprises braided or woven fibers and defines at least a portion of the dovetail portion and the airfoil portion, and the composite core has a material having a first bulk modulus;

wherein the laminate skin is formed with multiple plies overlaying the composite core and defines an outer wall of the composite airfoil assembly, and the laminate skin has a material having a second bulk modulus.

20. The composite airfoil assembly of claim 19, wherein the first bulk modulus and the second bulk modulus are non-equal.

* * * * *